US012668356B2

(12) United States Patent
Epperson et al.

(10) Patent No.: US 12,668,356 B2
(45) Date of Patent: Jun. 30, 2026

(54) ROBUST CONTROL OF OBLIQUE FLYING WING AIRCRAFT

(71) Applicant: Joby Aero, Inc., Santa Cruz, CA (US)

(72) Inventors: Matt Epperson, Boulder, CO (US); Thomas Victor Greenhill, Santa Cruz, CA (US); Charles Graham Blair Horn, Santa Cruz, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 77 days.

(21) Appl. No.: 18/628,183

(22) Filed: Apr. 5, 2024

(65) Prior Publication Data

US 2024/0336349 A1 Oct. 10, 2024

Related U.S. Application Data

(60) Provisional application No. 63/494,981, filed on Apr. 7, 2023.

(51) Int. Cl.
| | |
|---|---|
| *B64C 13/26* | (2006.01) |
| *G05D 1/495* | (2024.01) |
| *B64C 39/00* | (2023.01) |
| *B64C 39/10* | (2006.01) |
| *G05D 109/22* | (2024.01) |

(52) U.S. Cl.
CPC ............. *B64C 13/26* (2013.01); *G05D 1/495* (2024.01); *B64C 39/029* (2020.01); *B64C 39/10* (2013.01); *G05D 2109/22* (2024.01)

(58) Field of Classification Search
CPC ....... B64C 13/26; B64C 39/029; B64C 39/10; B64C 13/16; G05D 1/495; G05D 2109/22; G05D 1/496
See application file for complete search history.

(56) References Cited

U.S. PATENT DOCUMENTS

| | | | |
|---|---|---|---|
| 3,035,789 A | 5/1962 | Young | |
| 4,022,405 A | 5/1977 | Peterson | |
| 5,823,468 A | 10/1998 | Bothe | |
| | | (Continued) | |

FOREIGN PATENT DOCUMENTS

| | | |
|---|---|---|
| EP | 0945841 A1 | 9/1999 |
| EP | 2698749 A1 | 2/2014 |
| | (Continued) | |

OTHER PUBLICATIONS

Application of Unmanned Aircraft Pid Control System for Roll, Pitch and Yaw Stability On Fixed Wings Try Susanto, Farli Rossi, Muhammad Bayu Setiawan, Afrizal Hamdhi, Akhmad Jayadi , Jaka Persada Sembiring (Year: 2021).*

(Continued)

*Primary Examiner* — Kito R Robinson
*Assistant Examiner* — Alexander V Gentile
(74) *Attorney, Agent, or Firm* — Dority & Manning, P.A.

(57) ABSTRACT

A robust control method for an oblique flying wing aircraft includes computing an angular velocity error between a reference angular velocity and an actual angular velocity and computing a moment command with an angular velocity controller based at least in part on the angular velocity error. The angular velocity controller decouples two or more of a yaw rate axis, a pitch rate axis, and a roll rate axis of the asymmetric aircraft for the moment command.

19 Claims, 3 Drawing Sheets

(56) References Cited

U.S. PATENT DOCUMENTS

| | | | |
|---|---|---|---|
| 5,839,691 | A | 11/1998 | Lariviere |
| 5,842,667 | A | 12/1998 | Jones |
| 6,343,127 | B1 | 1/2002 | Billoud |
| 6,892,980 | B2 | 5/2005 | Kawai |
| 8,016,226 | B1 | 9/2011 | Wood |
| 8,020,804 | B2 | 9/2011 | Yoeli |
| 8,311,686 | B2 | 11/2012 | Herkes et al. |
| 8,733,690 | B2 | 5/2014 | Bevirt et al. |
| 8,737,634 | B2 | 5/2014 | Brown et al. |
| 8,849,479 | B2 | 9/2014 | Walter |
| 9,205,930 | B2 | 12/2015 | Yanagawa |
| 9,387,928 | B1 | 7/2016 | Gentry et al. |
| 9,415,870 | B1 | 8/2016 | Beckman et al. |
| 9,422,055 | B1 | 8/2016 | Beckman et al. |
| 9,435,661 | B2 | 9/2016 | Brenner et al. |
| 9,442,496 | B1 | 9/2016 | Beckman et al. |
| 9,550,561 | B1 | 1/2017 | Beckman et al. |
| 9,663,237 | B2 | 5/2017 | Senkel et al. |
| 9,694,911 | B2 | 7/2017 | Bevirt et al. |
| 9,771,157 | B2 | 9/2017 | Gagne et al. |
| 9,786,961 | B2 | 10/2017 | Dyer et al. |
| 9,802,702 | B1 | 10/2017 | Beckman et al. |
| 9,816,529 | B2 | 11/2017 | Grissom et al. |
| 9,838,436 | B2 | 12/2017 | Michaels |
| 10,140,873 | B2 | 11/2018 | Adler et al. |
| 10,152,894 | B2 | 12/2018 | Adler et al. |
| 10,216,190 | B2 | 2/2019 | Bostick et al. |
| 10,249,200 | B1 | 4/2019 | Grenier et al. |
| 10,304,344 | B2 | 5/2019 | Moravek et al. |
| 10,330,482 | B2 | 6/2019 | Chen et al. |
| 10,593,215 | B2 | 3/2020 | Villa |
| 10,593,217 | B2 | 3/2020 | Shannon |
| 10,752,365 | B2 | 8/2020 | Galzin |
| 10,759,537 | B2 | 9/2020 | Moore et al. |
| 10,768,201 | B2 | 9/2020 | Luo et al. |
| 10,832,581 | B2 | 11/2020 | Westervelt et al. |
| 10,836,470 | B2 | 11/2020 | Liu et al. |
| 10,913,528 | B1 | 2/2021 | Moore et al. |
| 10,948,910 | B2 | 3/2021 | Taveira et al. |
| 10,960,785 | B2 | 3/2021 | Villanueva et al. |
| 11,130,566 | B2 | 9/2021 | Mikic et al. |
| 11,145,211 | B2 | 10/2021 | Goel et al. |
| 11,238,745 | B2 | 2/2022 | Villa et al. |
| 11,295,622 | B2 | 4/2022 | Goel et al. |
| 2010/0079342 | A1 | 4/2010 | Smith et al. |
| 2014/0179535 | A1 | 6/2014 | Stückl et al. |
| 2016/0311529 | A1 | 10/2016 | Brotherton-Ratcliffe et al. |
| 2017/0197710 | A1 | 7/2017 | Ma |
| 2017/0357914 | A1 | 12/2017 | Tulabandhula et al. |
| 2018/0018887 | A1 | 1/2018 | Sharma et al. |
| 2018/0053425 | A1 | 2/2018 | Adler et al. |
| 2018/0216988 | A1 | 8/2018 | Nance |
| 2018/0308366 | A1 | 10/2018 | Goel et al. |
| 2018/0354636 | A1 | 12/2018 | Darnell et al. |
| 2019/0146508 | A1 | 5/2019 | Dean et al. |
| 2019/0221127 | A1 | 7/2019 | Shannon |
| 2019/0316849 | A1 | 10/2019 | Abrego et al. |
| 2020/0103922 | A1 | 4/2020 | Nonami et al. |
| 2020/0182637 | A1 | 6/2020 | Kumar et al. |
| 2020/0388166 | A1 | 12/2020 | Rostamzadeh et al. |

FOREIGN PATENT DOCUMENTS

| | | | |
|---|---|---|---|
| EP | 3499634 | A1 | 6/2019 |
| JP | 2010095246 | A | 4/2010 |
| JP | 2013086795 | A | 5/2013 |
| WO | WO 2018023556 | A1 | 2/2018 |
| WO | WO 2019089677 | A1 | 5/2019 |
| WO | WO 2020252024 | A1 | 12/2020 |

OTHER PUBLICATIONS

Decoupling Control Synthesis for an Oblique-Wing Aircraft, Robert W. Kempel, Joseph W. Pahle (Year: 1986).*

A Piloted Evaluation of an Oblique-Wing Research Aircraft Motion Simulation, Robert W. Kempel, Walter E. McNeill, Glenn B. Gilyard, and Trindel A. Maine (Year: 1988).*

Application of Unmanned Aircraft Pid Control System for Roll, Pitch, and Yaw Stability On Fixed Wings Try Susanto, Farli Rossi, Muhammad Bayu Setiawan, Afrizal Hamdhi, Akhmad Jayadi, Jake Persada Sembiring (Year: 2021).*

Sliding mode control design for oblique wing aircraft in wing skewing process, Ting Yue, Zijian Xu, Lixin Wang, Tong Wang (Year: 2018).*

Decoupling Control Law Design for Oblique-Wing Aircraft based on Eigenstructure Assignment and Model Following, Lu Qiu, Zhenghong Gao, Yan Liu (Year: 2021).*

Output Model-Following Control Synthesis for an Oblique-Wing Aircraft, Joseph W. Pahle (Year: 1990).*

Flight Control for the F-8 Oblique Wing Research Aircraft, Dale F. Enns, Daniel J. Bugajski, and Martin J. Klepl (Year: 1988).*

Bennaceur et al., "Passenger-centric urban air mobility: Fairness trade-offs and operational efficiency", Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

Alag et al., "Model-following control for an oblique-wing aircraft", NASA, 1986, 13 pages.

Desktop Aeronautics, Inc., "Oblique flying wings: an introduction and white paper", 2005, 51 pages.

Kempel et al., "A piloted evaluation of an oblique-wing research aircraft motion simulation with decoupling control laws", NASA, 1988, 52 pages.

Morris, "Integrated aerodynamic and control system design of oblique wing aircraft", NASA. 1990, 274 pages.

Pahle, "Output mode-following control synthesis for an oblique-wing aircraft", NASA 1990, 30 pages.

Phillips, "Modal control of an oblique wing aircraft", NASA, 1989, 48 pages.

* cited by examiner

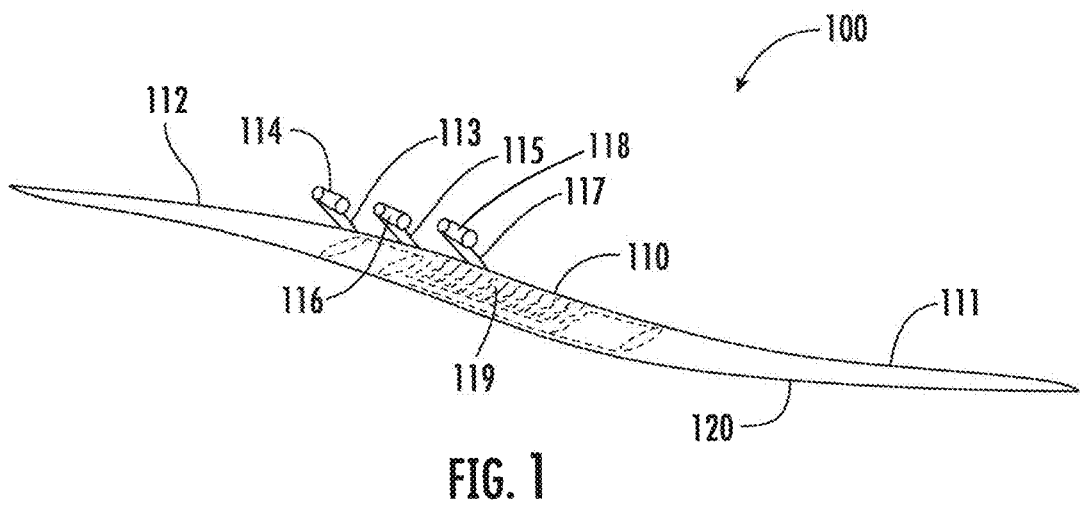
FIG. 1
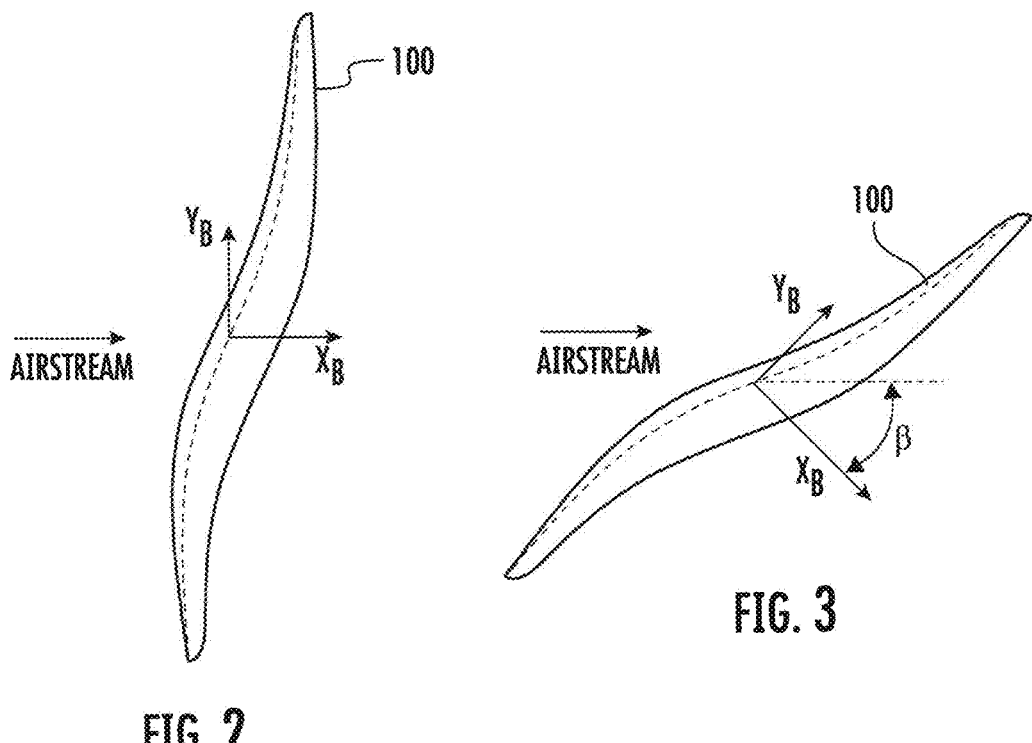
FIG. 2
FIG. 3

200

$\omega_c$    210    $\omega_{err}$    CONTROLLER 220    Mc    ALLOCATOR 230    $C_c$    ACTUATOR(S) 240    $\omega_a$

300

ESTABLISH AN ANGULAR VELOCITY ERROR. — 310

DETERMINE A MOMENTUM COMMAND. — 320

DETERMINE A CONTROL SURFACE COMMAND. — 330

ROBUST CONTROL OF OBLIQUE FLYING WING AIRCRAFT

CROSS-REFERENCE TO RELATED APPLICATION

The present application claims priority to and benefit of U.S. Provisional Patent Application 63/494,981 having a filing date of Apr. 7, 2023, which is hereby incorporated by reference in its entirety.

FIELD

The present disclosure relates generally to control of oblique flying wing aircraft.

BACKGROUND

Tail-less asymmetrically swept wing (oblique flying wing) aircraft can offer many advantages over conventional aircraft, especially at high transonic and low supersonic speeds. However, oblique flying wing aircraft pose technical challenges. For instance, aerodynamic and inertial couplings in oblique flying wing aircraft can result in unique stability and handling characteristics that are different than conventional aircraft.

Control methods and systems for improving stability and handling characteristics of oblique flying wing aircraft would be useful.

SUMMARY

Aspects and advantages of embodiments of the present disclosure will be set forth in part in the following description, or may be learned from the description, or may be learned through practice of the embodiments.

Aspects of the present disclosure are directed to a robust control method for decoupled stabilization of an oblique flying wing aircraft. The method includes computing an angular velocity error between a reference angular velocity and an actual angular velocity estimate and computing a moment command with an angular velocity controller based at least in part on the angular velocity error. A plant matrix of the angular velocity controller is dense such that each component of the plant matrix is non-zero, and a closed-loop transfer function matrix of the angular velocity controller comprises non-zero value diagonal components and zero value off-diagonal components. The method also includes adjusting one or more control effectors of the oblique flying wing aircraft based at least in part on the moment command.

Aspects of the present disclosure are also directed to a robust control method for decoupled stabilization of an oblique flying wing aircraft. The method includes computing an angular velocity error between a reference angular velocity and an actual angular velocity and computing a moment command with an angular velocity controller based at least in part on the angular velocity error, wherein the angular velocity controller comprises a function $$G_c(s) = [-IA\vec{\omega}_n^2 \quad I^T\vec{\omega}_n^2] \left[ s\mathbb{1}_{6\times6} - \begin{bmatrix} \textcircled{0}_{3\times3} & \mathbb{1}_{3\times3} \\ \textcircled{0}_{3\times3} & -2\zeta\vec{\omega}_n \end{bmatrix} \right]^{-1} \begin{bmatrix} \textcircled{0}_{3\times3} \\ \mathbb{1}_{3\times3} \end{bmatrix}$$

wherein $I$ is a moment of inertia matrix, A is a state matrix defined as $$A = I^{-1}\frac{\partial M}{\partial w}, \frac{\partial M}{\partial w}$$

is a Jacobian of a moment with respect to angular velocity for a plurality of rotational axes of the oblique flying wing aircraft, $\vec{\zeta}$ is a prescribed damping ratio, and $\vec{\omega}_n$ is a prescribed natural frequency. The method also includes adjusting one or more control effectors of the oblique flying wing aircraft based at least in part on the moment command.

Aspects of the present disclosure are also directed to a robust control method for decoupled stabilization of an asymmetric aircraft that includes computing an angular velocity error between a reference angular velocity and an actual angular velocity. The method also include computing a moment command with an angular velocity controller based at least in part on the angular velocity error. The angular velocity controller decouples two or more of a yaw rate axis, a pitch rate axis, and a roll rate axis of the asymmetric aircraft for the moment command. The method further includes adjusting one or more control effectors of the asymmetric aircraft based at least in part on the moment command such that a yaw rate adjustment command only adjusts yaw of the asymmetric aircraft, a pitch rate adjustment command only adjusts pitch of the asymmetric aircraft, and a roll rate adjustment command only adjusts roll of the asymmetric aircraft.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures.

FIG. 1 is a perspective view of an oblique flying wing aircraft according to an example embodiment of the present disclosure.

FIG. 2 is a top plan view of an oblique flying wing aircraft in a take-off configuration according to an example embodiment of the present disclosure.

FIG. 3 is a top plan view of an oblique flying wing aircraft in a high-speed configuration according to an example embodiment of the present disclosure.

Figure 4:
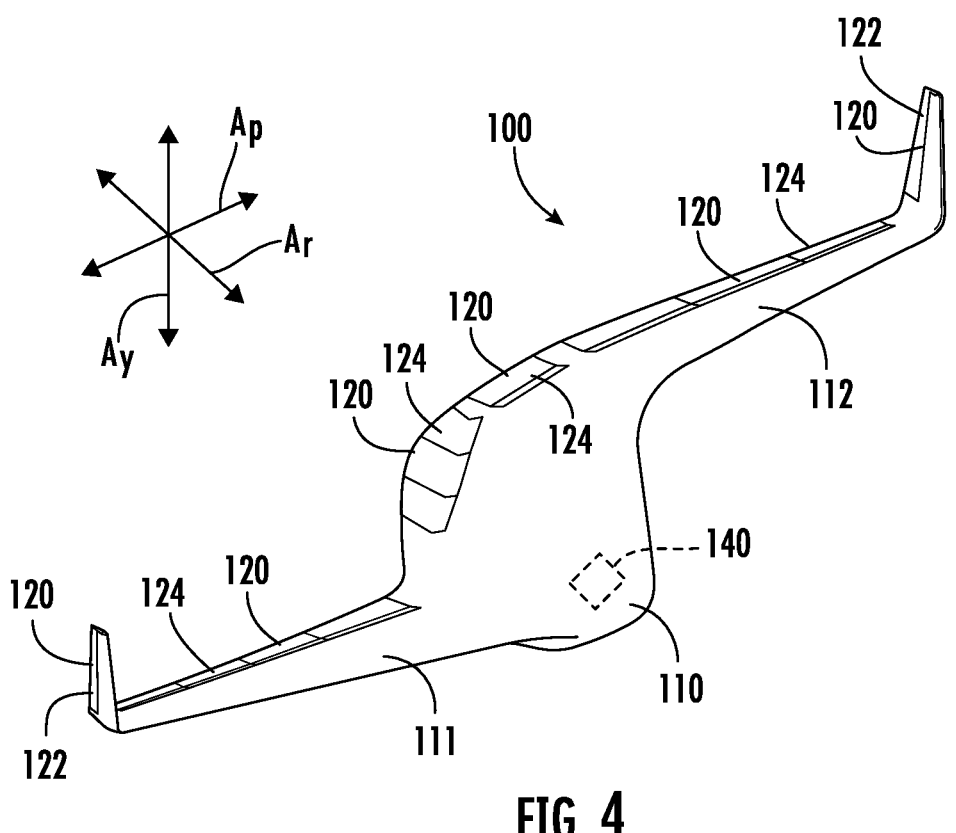
FIG. 4 is a perspective view of an oblique flying wing aircraft according to an example embodiment of the present disclosure.

Repeat use of reference characters in the present specification and drawings is intended to represent the same or analogous features or elements of the present invention.

DETAILED DESCRIPTION

Generally, the present disclosure is directed to systems and methods for robust control of oblique wing aircraft. The systems and methods of the present disclosure can advantageously assist with decoupling (e.g., two or more of) the yaw rate, pitch rate, and roll rate axes. Moreover, an angular velocity controller may be configured for frequency domain decoupling of the yaw rate, pitch rate, and roll rate axes of the oblique wing aircraft. In example embodiments, the angular velocity controller may include a state matrix, such as a 3×3 matrix, with each diagonal component being non-zero and each off-diagonal component being zero to decouple the roll, yaw, and pitch, e.g., such that yaw only affects yaw, pitch only affects pitch, and roll only affects roll. Moreover, the angular velocity controller may provide decoupled responses with prescribed damping and natural frequencies. In such a manner, control of the oblique wing aircraft may be facilitated despite the strong aerodynamic and inertial couplings.

In example aspects, the angular velocity controller may be gain scheduled based on dynamic pressure and airspeed to assist with transitioning between operating states of the oblique wing aircraft.

For robust control, the angular velocity controller may include a dense plant model with reduced dynamics, such as only angular velocity and damping, for the oblique wing aircraft.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

The terms "coupled," "fixed," "attached to," and the like refer to both direct coupling, fixing, or attaching, as well as indirect coupling, fixing, or attaching through one or more intermediate components or features, unless otherwise specified herein.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply embodiments of the disclosure. Hence, specific dimensions and other physical characteristics related to the embodiments disclosed herein are not to be considered as limiting.

FIG. 1 is a perspective view of an oblique flying wing aircraft 100 according to an example embodiment of the present disclosure. As shown in FIG. 1, the oblique flying wing aircraft 100 may include a center-wing segment 110, a left-wing segment 111, and a right-wing segment 112. The center-wing segment 110 may be substantially thicker in the height direction and may be thick enough to allow for passengers in a passenger area 119. A plurality of thrust units 114, 116, 118 may use pivoting pylons 113, 115, 117, which allow for thrusting in different forward flight configurations. The thrust units 116, 114, 118 may be electrically powered fan units with an internal fan. In some example aspects, each of the electrically powered fan units may be powered by a plurality of fuel cells.

The rotation of the thrust units 114, 116, 118 may change the sweep of the oblique flying wing aircraft 100, e.g., both due to the change in thrust direction and also due to a rudder effect of the pylons 113, 115, 117. There may also be trimming and control surfaces and devices which assist in the sweep change. It will be understood that oblique flying wing aircraft 100 may be adjusted to various sweep arrangements. Two example configurations of the oblique flying wing aircraft 100, with different sweep angles, are shown below in FIGS. 2 and 3. However, it will be understood that oblique flying wing aircraft 100 is not limited to the two arrangements shown in FIGS. 2 and 3 and may be adjustable to other sweep angles in example embodiments.

FIG. 2 shows the oblique flying wing aircraft 100 in a take-off configuration, in which leading edges of the wing segments 111, 112 are substantially perpendicular to the prevailing airflow. Thus, the arrangement of the oblique flying wing aircraft 100 in FIG. 2 may correspond to a low (er) speed flight configuration, e.g., in which the span length of the wing segments 111, 112 is maximized. The span length of the wing segments 111, 112 may extend predominantly perpendicular to the airflow in the take-off configuration. In contrast, the center segment 110 may be swept at an angle from the airflow direction in the take-off configuration.

FIG. 3 shows the oblique flying wing aircraft 100 in a high-speed flight configuration, in which the oblique flying wing aircraft 100 is rotated relative to the airflow direction. In the high-speed flight configuration shown in FIG. 3, all segments 110, 111, 112 of the oblique flying wing aircraft 100 have more sweep than in the take-off configuration shown in FIG. 2. Moreover, the center-wing segment 110 may be more swept relative to the airflow direction than the outer wing segments 111, 112. This asymmetric sweep between the center-wing segment 110 and the left and right-wing segments 111, 112 may allow for a thicker center-wing segment 110, which may be utilized to accommodate pilots, passengers, and other cargo. The higher sweep of the center-wing segment 110 may also reduce or eliminate the wave drag penalty associated with the increased thickness of the center-wing segment 110.

Figure 5:
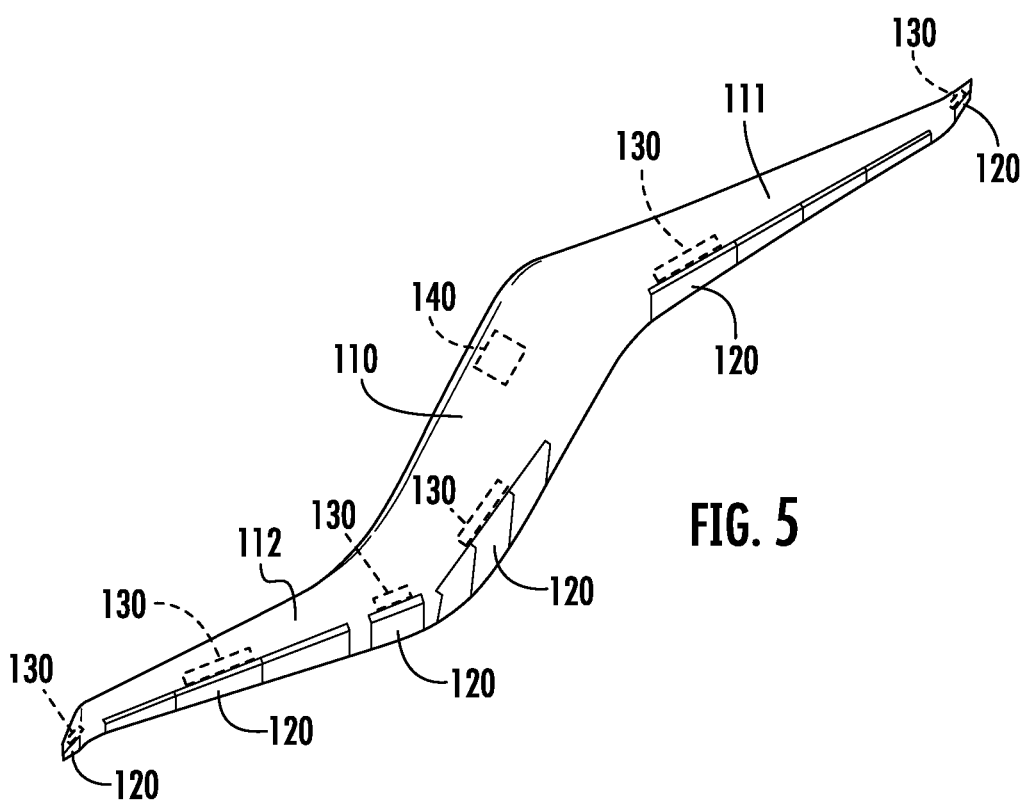
FIG. 5 is a top plan view of the example oblique flying wing aircraft of FIG. 4.

FIG. 4 is a perspective view of an oblique flying wing aircraft 100 according to another example embodiment of the present disclosure. FIG. 5 is a top plan view of the oblique flying wing aircraft 100 of FIG. 4. As noted above, the oblique flying wing aircraft 100 may include trimming and control surfaces and devices. As an example, with reference to FIGS. 4 and 5, the oblique flying wing aircraft 100 may include a plurality of control surfaces 120 that are adjustable with a plurality of actuators 130 (shown schematically). Moreover, e.g., each of the control surfaces 120 may be adjusted by a respective one or more of the actuators 130. Thus, in response to control commands, actuators 130 may deflect control surfaces 120 in order to adjust the attitude of the oblique flying wing aircraft 100. The actuators 130 may be any suitable actuator, such as an electric actuator, a hydraulic actuator, etc.

As shown in FIG. 4, deflection of the control surfaces 120 may adjust the attitude of the oblique flying wing aircraft 100 about three axes, namely, a yaw axis $A_y$, a pitch axis $A_p$, and a roll axis $A_r$. The yaw axis $A_y$, pitch axis $A_p$, and roll axis $A_r$ may be mutually perpendicular. It will be understood that the particular orientation of the three axes shown in FIG. 4 is provided by way of example and that the orientation of the axes may vary, e.g., as the sweep of the oblique flying wing aircraft 100 changes.

Subsets of the control surfaces 120 may be configured for primarily or predominately adjusting the attitude of the oblique flying wing aircraft 100 about one or more of the yaw axis $A_y$, pitch axis $A_p$, and roll axis $A_r$. For example, yaw control surfaces 122 may be disposed on winglet(s) disposed at distal end portions of the wing segments 111, 112. For instance, the yaw control surfaces 122 may be generally oriented along a vertical direction on the oblique flying wing aircraft 100. The yaw control surfaces 122 may be deflected by respective actuators 130 in order to primarily or predominately adjust the attitude of the oblique flying wing aircraft 100 about the yaw axis $A_y$, e.g., in the take-off configuration (FIG. 2). Actuation of the yaw control surfaces 122 may have little to no effect on the attitude of the oblique flying wing aircraft 100 about the pitch axis $A_p$ and/or about the roll axis $A_r$ due to the limited coupling of the yaw control surfaces 122 to such axes.

As another example, pitch and roll control surfaces 124 may be disposed on center-wing segment 110 as well the left and right-wing segments 111, 112. For instance, the pitch and roll control surfaces 124 may be generally oriented along a horizontal direction on the oblique flying wing aircraft 100 and/or generally perpendicular to the yaw control surfaces 122. The pitch and roll control surfaces 124 may be deflected by respective actuators 130 in order to primarily or predominately adjust the attitude of the oblique flying wing aircraft 100 about the pitch axis $A_p$ and/or about the roll axis $A_r$, e.g., in the take-off configuration. In contrast, actuation of the pitch and roll control surfaces 124 may have little effect on the attitude of the oblique flying wing aircraft 100 about the yaw axis $A_y$ due to the limited coupling of the pitch and roll control surfaces 124 to such axis.

As may be seen from the above, deflection of the pitch and roll control surfaces 124 may have a coupled effect on roll and pitch moments of the oblique flying wing aircraft 100. As discussed in greater detail below, due to the coupling about the pitch axis $A_p$ and the roll axis $A_r$, a control system of the present subject matter may compute control commands for the pitch and roll control surfaces 124 that correspond to moment commands from a robust angular velocity controller. Thus, for example, when the robust angular velocity controller outputs a moment command for roll moment only (i.e., zero pitch moment), the control system may compute control commands such that only roll moment is produced, e.g., the sum of the nonzero pitch moments produced by deflection of each individual pitch and roll control surface 124 is zero.

It will be understood that the subsets of control surfaces 120 described above for adjusting the attitude of the oblique flying wing aircraft 100 about the yaw axis $A_y$, pitch axis $A_p$, and roll axis $A_r$ may vary depending upon the sweep of the oblique flying wing aircraft 100.

The oblique flying wing aircraft 100 may also include a processing device or computing device 140 (shown schematically) that may be generally configured to facilitate operation of at least a portion of the oblique flying wing aircraft 100. In this regard, as discussed in greater detail below, thrust units 114, 116, 118 and/or control surfaces 120 of the oblique flying wing aircraft 100 may be adjusted by the computing device 140 to assist with stabilizing the oblique flying wing aircraft 100 and/or implementing control commands from a pilot.

As used herein, the terms "processing device," "computing device," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "computing device" are not necessarily restricted to a single element but may include any suitable number, type, and configuration of processing devices integrated in any suitable manner to facilitate aircraft operation.

The computing device 140 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices may store information and/or data accessible by the one or more processors, including instructions that may be executed by the one or more processors. It should be appreciated that the instructions may be software written in any suitable programming language or may be implemented in hardware. Additionally, or alternatively, the instructions may be executed logically and/or virtually using separate threads on one or more processors.

For example, the computing device 140 may be operable to execute programming instructions or micro-control code associated with operation of the oblique flying wing aircraft 100. In this regard, the instructions may be software or any set of instructions that when executed by the processing device, cause the processing device to perform operations, such as running one or more software applications, adjusting the operating parameters of oblique flying wing aircraft 100, etc. Moreover, it should be noted that the computing device 140 as disclosed herein is capable of and may be operable to perform any methods, method steps, or portions of methods as disclosed herein. For example, in some example embodiments, methods disclosed herein may be embodied in programming instructions stored in the memory and executed by the computing device 140.

It will be understood that the oblique flying wing aircraft 100 is provided by way of example. The present subject matter may also be used in or with other asymmetrical or oblique flying wing aircraft to provide robust control. For example, the present subject matter may be used in or with any of the oblique flying wing aircraft describe in U.S.

Patent Application No. 2022/0177131 of Mikic et al., which is incorporated herein in its entirety for all purposes.

Figures 6, 7:
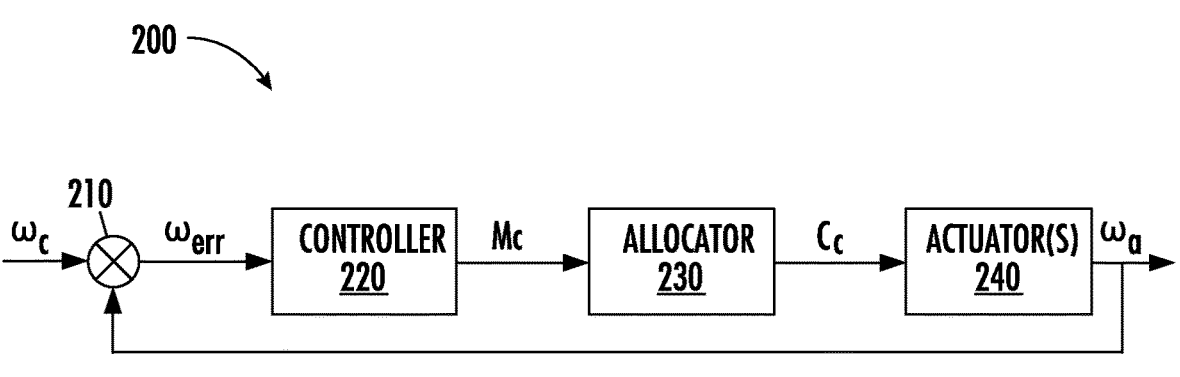
FIG. 6 is a schematic view of a control system for an oblique flying wing aircraft according to an example embodiment of the present disclosure.
FIG. 7 is a flowchart of a control method for an oblique flying wing aircraft according to an example embodiment of the present disclosure.

FIG. 6 is a schematic view of a control system 200 for an oblique flying wing aircraft according to an example embodiment of the present disclosure. Control system 200 is described in greater detail below in the context of the oblique flying wing aircraft 100 (FIG. 1). However, it will be understood that the control system 200 may be used in or with other asymmetrical or oblique flying wing aircraft in alternative example embodiments. The asymmetry of the oblique flying wing aircraft 100 due to the skew angle can result in strong aerodynamic and inertial coupling, e.g., relative to conventional symmetrical aircraft. As discussed in greater detail below, the control system 200 may assist with robust control of the oblique flying wing aircraft 100, e.g., that decouples the yaw rate, pitch rate, and roll rate axes.

As shown in FIG. 6, control system 200 may include a comparator 210. Comparator 210 may access a commanded angular velocity $\omega_c$ and an actual angular velocity $\omega_a$, and comparator 210 may compute an angular velocity error $\omega_{err}$. The commanded angular velocity $\omega_c$ may correspond to a reference or input value for the angular velocity and may be accessed by receiving data signals from another system, such as a pilot input, or retrieving such information from a memory. The actual angular velocity $\omega_a$ may correspond to a measured, observed, or estimated value for the angular velocity. The angular velocity error $\omega_{err}$ may be computed as a difference between the commanded angular velocity $\omega_c$ and the actual angular velocity $\omega_a$. The angular velocity error $\omega_{err}$ may include a plurality of velocity error components about a plurality of rotational axes. For instance, the angular velocity error $\omega_{err}$ may include a $3 \times 1$ vector with components about each of the yaw rate, pitch rate, and roll rate axes.

Control system 200 may also include a controller 220, also referred to herein as an angular velocity controller. The controller 220 may receive the angular velocity error $\omega_{err}$ from the comparator 220. The controller 220 may output a moment command $M_c$ to an allocator 230. The moment command $M_c$ may correspond to moments about a plurality of axes due to actuation of control effectors, such control surface deflections or propulsors, about the plurality of axes. The moment command $M_c$ may include a plurality of moment command components, and each of the components may correspond to a respective moment about each of a plurality of rotational axes. For instance, the moment command $M_c$ may include a $3 \times 1$ vector with components about each of the yaw rate, pitch rate, and roll rate axes.

As shown in FIG. 6, control system 200 may further include an allocator 230. The allocator 230 may access the moment command $M_c$ from the controller 220. The allocator 230 may output a control command $C_c$ to one or more actuators 240, such as actuators 130. The control command $C_c$ may correspond to actuation commands for control effectors, such control surface deflections or propulsors, about a plurality of axes that implement the moment command $M_c$. The control surfaces 120 may be deflected or adjusted by one or more actuators 240 to implement the control command $C_c$. The actual angular velocity $\omega_a$ may be measured or observed after deflecting or adjusting the control surfaces 120 with the one or more actuators 240.

Example aspects of controller 220 are described in greater detail below. The controller 220 may include a plant model. The plant model may correspond to a minimum representative linear realization of a full nonlinear plant of the oblique flying wing aircraft 100. The minimum state space realization of the angular velocity dynamics for the oblique flying wing aircraft 100 may be given as:

$$\dot{\omega} \approx I^{-1}\left(\frac{\partial M}{\partial \omega}\omega + \frac{\partial M}{\partial C_c}C_c\right)$$

wherein
$\dot{\omega}$ is an angular acceleration,
$\omega$ is an angular velocity,
$C_c$ is a control surface deflection,
$I$ is a moment of inertia matrix, $$\frac{\partial M}{\partial \omega}$$

is a Jacobian of a moment with respect to angular velocity, and $$\frac{\partial M}{\partial C_c}$$

IS a Jacobian of a moment with respect to control surface deflection.

The controller 220 may be robust by only considering a reduced or minimum number of dynamic considerations for the oblique flying wing aircraft 100 in the plant model. The inertia matrix of the plant model may be dense such that each component of the inertia matrix is non-zero. Thus, the inertia matrix may be populated with moments and products of inertia that reflect the asymmetry of the oblique flying wing aircraft 100.

In state-space form and by letting $$M_{C_c} = \frac{\partial M}{\partial C_c}C_c,$$

where $C_c$ is determined by the allocator 230 to achieve $M_{c_c}$, the input to the plant model may be given as:

$$A = I^{-1}\frac{\partial M}{\partial \omega}$$
$$B = I^{-1}$$

The state matrix A may be dense such that each component of the state matrix A is non-zero. Thus, e.g., the state matrix A may be $3 \times 3$ matrix with each component of the state matrix A being non-zero.

Due to the inertial and aerodynamic coupling, the plant model may be given as:

$$G_p(s) = (sI - A)^{-1}B = \begin{bmatrix} G_{p_{11}} & G_{p_{12}} & G_{p_{13}} \\ G_{p_{21}} & G_{p_{22}} & G_{p_{23}} \\ G_{p_{31}} & G_{p_{32}} & G_{p_{33}} \end{bmatrix}$$

Moreover, a Laplace Transform of the minimum state space realization of the angular velocity dynamics for the oblique flying wing aircraft 100 noted above may be taken and the matrices A and B may be substituted therein to arrive at the plant model above. The plant model may be dense such that each component of the plant model is non-zero. Thus, as shown above, the plant model may be 3×3 matrix with each component of the plant model being non-zero. Each component ($G_p$) of the plant model matrix may correspond to a respective angular velocity component about a given axis, i.e., one of the yaw rate, pitch rate, and roll rate axes.

The controller 220 may output moment commands, $M_{\delta a}$ (s) and receive as inputs angular velocity error, $\omega_{err}$(s). $M_{\delta a}$ corresponds to a moment about a given axis due to a control surface deflection about the given axis. The controller 220 may thus relate the moment about a given axis to an angular velocity about the given axis. The controller 220 may be dense such that every moment command output responds to every angular velocity error input.

$$\frac{M_{C_c}(s)}{\omega_{err}(s)} = \begin{bmatrix} G_{c_{11}} & G_{c_{12}} & G_{c_{13}} \\ G_{c_{21}} & G_{c_{22}} & G_{c_{23}} \\ G_{c_{31}} & G_{c_{32}} & G_{c_{33}} \end{bmatrix}$$

The controller 220 may be designed such that the closed loop system is shaped to behave like a set of decoupled second order systems. For instance, $$T_y(s) = \begin{bmatrix} T_{y_1} & 0 & 0 \\ 0 & T_{y_2} & 0 \\ 0 & 0 & T_{y_3} \end{bmatrix}$$

wherein $$T_{y_1}(s) = \frac{\omega_{n_1}^2}{s^2 + 2\zeta_1\omega_{n_1}s + \omega_{n_1}^2},$$

$$T_{y_2}(s) = \frac{\omega_{n_2}^2}{s^2 + 2\zeta_2\omega_{n_2}s + \omega_{n_2}^2},$$

and $$T_{y_3}(s) = \frac{\omega_{n_3}^2}{s^2 + 2\zeta_3\omega_{n_3}s + \omega_{n_3}^2}.$$

Thus, the three axes of the oblique flying wing aircraft 100 may be decoupled. Moreover, the yaw rate, pitch rate, and roll rate axes of the oblique flying wing aircraft 100 may be decoupled.

A forward path transfer function and a closed loop transfer function may also be provided. The forward path transfer function matrix may be given as: $L_y(s)=G_pG_c$, and the closed loop transfer function may be given as: $T_y=(1+L_y)^{-1}L_y$.

Using the above, solving for $G_c$, and simplifying the results with a Youla parametrization, the following may be derived as an expression of the controller 220:

$$G_c(s) = \begin{bmatrix} -IA\vec{\omega}_n^2 & -I^T\vec{\omega}_n^2 \end{bmatrix}\begin{bmatrix} -s\mathbb{1}_{6\times6}\begin{bmatrix} \mathbb{0}_{3\times3} & \mathbb{1}_{3\times3} \\ \mathbb{0}_{3\times3} & -2\zeta\vec{\omega}_n \end{bmatrix} \end{bmatrix}^{-1}\begin{bmatrix} \mathbb{0}_{3\times3} \\ \mathbb{1}_{3\times3} \end{bmatrix}$$

wherein
I is a moment of inertia matrix,
A is a state matrix defined as $$A = I^{-1}\frac{\partial M}{\partial \omega},$$

$\vec{\zeta}$ is a prescribed damping ratio, and
$\vec{\omega}_n$ is a prescribed natural frequency.
In the above expression of the controller 220, $$\begin{bmatrix} -IA\vec{\omega}_n^2 & I^T\vec{\omega}_n^2 \end{bmatrix}$$

may correspond to an output matrix $$C_{ss}, \begin{bmatrix} \mathbb{0}_{3\times3} & \mathbb{1}_{3\times3} \\ \mathbb{0}_{3\times3} & -2\zeta\vec{\omega}_n \end{bmatrix}$$

may correspond to a state matrix $$A_{ss}, \begin{bmatrix} \mathbb{0}_{3\times3} \\ \mathbb{1}_{3\times3} \end{bmatrix}$$

may correspond to an input matrix $B_{ss}$. A feedthrough matrix $D_{ss}$ may correspond to zeros. The matrices in the above expression may lay out a conversion from continuous-time frequency domain to continuous-time time domain via the output matrix $C_{ss}$, the state matrix $A_{ss}$, the input matrix $B_{ss}$, and the feedthrough matrix $D_{ss}$ for the controller 220. Such expression in state space may facilitate discretization and ease real time implementation of the controller 220. As may be seen from the above, the controller 220 may decouple (e.g., two or more of) the yaw rate, pitch rate, and roll rate axes for the moment command $M_c$.

Utilizing the controller 220, a total moment $M_c$ required to produce the commanded angular velocity $\omega_c$ may be determined. Moreover, the allocator 230 may be configured for determining an arrangement of control effectors that provide the total moment $M_c$ required to produce the commanded angular velocity $\omega_c$. In example embodiments, the allocator 230 may be a quadratic programming allocator, e.g., configured to minimize a convex function in order to determine the optimal arrangement of control effectors that provide the total moment $M_c$ required to produce the commanded angular velocity $\omega_c$ subject to constraints. As an example, the allocator 230 may determine the arrangement of control effectors based at least in part on the moment command $M_c$ such that a yaw rate adjustment command only adjusts yaw of the aircraft, a pitch rate adjustment command only adjusts pitch of the aircraft, and a roll rate adjustment command only adjusts roll of the aircraft. The yaw rate adjustment command, pitch rate adjustment command, and/or roll rate adjustment command may be pilot generated, autonomous-control generated, etc.

In example embodiments, the system 200 may also include features for facilitating real-time implementation on the oblique flying wing aircraft 100 and/or for anti-windup to avoid or prevent saturation of the actuators 240.

In order to allow implementation on the computing device 140 of the oblique flying wing aircraft 100, the controller 220 may require two conversions, namely, (1) from the frequency domain to the continuous time domain and (2) from the continuous time domain to the discrete time domain. As noted above, the controller 220 may be expressed within the following:

$$G_c(s) = \begin{bmatrix} -I A \vec{\omega}_n^2 & I^T \vec{\omega}_n^2 \end{bmatrix} \begin{bmatrix} s\mathbb{1}_{6\times6} - \begin{bmatrix} \mathbb{0}_{3\times3} & \mathbb{1}_{3\times3} \\ \mathbb{0}_{3\times3} & -2\vec{\zeta}\vec{\omega}_n \end{bmatrix} \end{bmatrix}^{-1} \begin{bmatrix} \mathbb{0}_{3\times3} \\ \mathbb{1}_{3\times3} \end{bmatrix}$$

Thus, to achieve the conversion from the frequency domain to the continuous time domain, the controller 220 may be expressed a state-space model. The conversion from the continuous time domain to the discrete time domain may be implemented by a bilinear transformation, e.g., without requiring complex pivoting or inversion of a matrix. Thus, e.g., a Youla parametrized controller may be implemented in real time on the computing device 140 of the oblique flying wing aircraft 100.

The controller 220 may also effectively act as a PI controller in each of the decoupled axes with the integrator effective to reject uncertainties within the system 200. However, the integrator may carry error forward within the system 200. Thus, an exponential decay block may be applied to a time step integrators of the controller 220. The exponential decay may be tuned to allow the time dynamics of the response to avoid overshoot due to error. Thus, over time, the system 200 may decay to a zero state.

System 200 may also include features for anti-windup to avoid or prevent saturation of the actuators 240. For example, allocator 230 may determine an arrangement of control effectors that provide the total moment $M_c$ required to produce the commanded angular velocity $\omega_c$. However, one or more of the actuators 240 may be saturated and unable to adjust the control effectors of the oblique flying wing aircraft 100 to implement the control command $C_c$. When approaching such saturation of the actuators 240, anti-windup may be implemented. Moreover, components of an identity matrix may be adjusted from one to zero in order to implement the anti-windup. For instance, the controller 220 may be expressed within the following:

$$G_c(s) = \begin{bmatrix} -I A \vec{\omega}_n^2 & I^T \vec{\omega}_n^2 \end{bmatrix} \begin{bmatrix} s\mathbb{1}_{6\times6} - \begin{bmatrix} \mathbb{0}_{3\times3} & \mathbb{1}_{3\times3} \\ \mathbb{0}_{3\times3} & -2\vec{\zeta}\vec{\omega}_n \end{bmatrix} \end{bmatrix}^{-1} \begin{bmatrix} \mathbb{0}_{3\times3} \\ \mathbb{1}_{3\times3} \end{bmatrix}$$

The anti-windup may be implemented by adjusting components of the $\mathbb{1}_{3\times3}$ in the $$\begin{bmatrix} s\mathbb{1}_{6\times6} - \begin{bmatrix} \mathbb{0}_{3\times3} & \mathbb{1}_{3\times3} \\ \mathbb{0}_{3\times3} & -2\vec{\zeta}\vec{\omega}_n \end{bmatrix} \end{bmatrix}^{-1}$$

portion of function from one to zero. Thus, the components of such $\mathbb{1}_{3\times3}$ matrix may be toggled between one and zero depending upon whether anti-windup is needed for system 200. The exponential decay described above may continue to reduce the time step integrators while operating in anti-windup with the components of the $\mathbb{1}_{3\times3}$ set to zero.

FIG. 5 illustrates a method 300 for robust decoupled control of an oblique flying wing aircraft. Method 300 is described in greater detail below in the context of the oblique flying wing aircraft 100 and system 200. However, it will be understood that method 300 may be used in or with other asymmetrical or oblique flying wing aircraft and control systems to provide robust control.

At 310, a computing system (e.g., system 200) may compute an angular velocity error between a reference angular velocity and an actual angular velocity. For instance, at 310, comparator 210 may compute the difference between the commanded angular velocity $\omega_c$ and the actual angular velocity $\omega_a$ in order to establish the angular velocity error $\omega_{err}$. The actual angular velocity $\omega_a$ may be estimated, measured, observed, etc. during operation of the oblique flying wing aircraft 100.

At 320, the computing system may compute a moment command with an angular velocity controller based at least in part on the angular velocity error from 310. For instance, at 320, the controller 220 may access the angular velocity error der from the comparator 220 and may output the moment command $M_c$. An inertia matrix of the angular velocity controller at 320 may be dense such that each component of the inertia matrix is non-zero. Thus, the inertia matrix may be populated with moments and products of inertia that reflect the asymmetry of the oblique flying wing aircraft 100. The angular velocity controller may also have features that decouple the yaw rate, pitch rate, and roll rate axes. For instance, a closed-loop transfer function of the angular velocity controller may include a matrix with each diagonal component being non-zero and each off-diagonal component being zero. Moreover, the closed loop transfer function may include the following matrix $$T_y(s) = \begin{bmatrix} T_{y_1} & 0 & 0 \\ 0 & T_{y_2} & 0 \\ 0 & 0 & T_{y_3} \end{bmatrix}$$

Thus, the closed loop system may be shaped to behave like a set of decoupled second order systems. In such a manner, the yaw rate, pitch rate, and roll rate axes may be decoupled. A damping ratio and a natural frequency may also be prescribed for the angular velocity controller. In general, in example embodiments, a dense controller matrix may be shaped such that the closed loop behavior of the controlled system results in decoupled (diagonal) dynamics. As may be seen from the above, (e.g., two or more of) the yaw rate, pitch rate, and roll rate axes may be decoupled for the moment command.

At 330, the computing system may compute and output a control surface command with an allocator based at least in part on the moment command from 320. For instance, the allocator 230 may receive the moment command $M_c$ from 320 and output the control command $C_c$. Computing device 140 may deflect or adjust control surfaces 120 of the oblique flying wing aircraft 100 using the one or more actuators 240 in order to implement the control command $C_c$. As an example, the arrangement of control effectors may be selected such that a yaw rate adjustment command only adjusts yaw, a pitch rate adjustment command only adjusts pitch, and a roll rate adjustment command only adjusts roll. The yaw rate adjustment command, pitch rate adjustment command, and/or roll rate adjustment command may be pilot generated, autonomous-control generated, etc.

FIG. 5 depicts steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure. Moreover, although aspects of method 300 are explained using oblique flying wing aircraft 100 and system 200 as an example, it should be appreciated that these methods may be applied to the operation of any suitable oblique flying wing aircraft or control system.

As may be seen from the above, the present subject matter may advantageously assist with providing control systems and methods for control of oblique flying wing aircraft. The systems and methods of the present disclosure can advantageously assist with decoupling the yaw rate, pitch rate, and roll rate axes. Thus, the control systems and methods may ease pilot control of the oblique flying wing aircraft, e.g., such that the oblique flying wing aircraft is pilotable in a conventional manner. Moreover, pilot commands for adjustment of the yaw rate may only adjust yaw of the oblique flying wing aircraft, pilot commands for adjustment of the pitch rate may only adjust pitch of the oblique flying wing aircraft, and pilot commands for adjustment of the roll rate may only adjust roll of the oblique flying wing aircraft. In such a manner, control of the oblique flying wing aircraft may be facilitated despite the strong aerodynamic and inertial couplings in oblique flying wing aircraft. In addition, the systems and methods of the present disclosure can advantageously provide robust control of oblique flying wing aircraft. Thus, the systems and methods may utilize a reduced or minimum number of dynamic considerations for the oblique flying wing aircraft, e.g., in order to reduce processing and sensor requirements for implementing the systems and methods.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A robust control method for decoupled stabilization of an oblique flying wing aircraft, comprising:
computing an angular velocity error between a reference angular velocity and an actual angular velocity;
computing a moment command with an angular velocity controller based at least in part on the angular velocity error, wherein
a plant matrix of the angular velocity controller is dense such that each component of the plant matrix is non-zero, and
a closed-loop transfer function matrix of the angular velocity controller comprises non-zero value diagonal components and zero value off-diagonal components; and
adjusting one or more control effectors of the oblique flying wing aircraft based at least in part on the moment command.

2. The control method of claim 1, wherein a damping ratio and a natural frequency for each rotational axis of a plurality of rotational axes are prescribed for the angular velocity controller.

3. The control method of claim 1, wherein the angular velocity error comprises a plurality of velocity error components about a plurality of rotational axes.

4. The control method of claim 3, wherein the moment command comprises a plurality of moment command components, each of the plurality of moment command components corresponding to a respective moment about each rotational axis of the-plurality of rotational axes for a respective one of the plurality of velocity error components.

5. The control method of claim 1, further comprising determining a control surface command with an allocator based at least in part on the moment command, and wherein adjusting the one or more control effectors of the oblique flying wing aircraft comprises adjusting the one or more control effectors of the oblique flying wing aircraft based at least in part on the control surface command.

6. The control method of claim 5, wherein computing the control surface command with the allocator comprises computing an arrangement for the control effectors of the oblique flying wing aircraft for the moment command.

7. The control method of claim 1, further comprising applying an exponential decay to a time step integrator of the angular velocity controller.

8. The control method of claim 1, further comprising implanting anti-windup by adjusting components of an identity matrix from one to zero.

9. A robust control system for decoupled stabilization of an oblique flying wing aircraft, comprising:
one or more processors; and
one or more non-transitory computer-readable media that store instructions that, when executed by the one or more processors, cause the computing system to perform operations, the operations comprising
computing an angular velocity error between a reference angular velocity and an actual angular velocity,
computing a moment command with an angular velocity controller based at least in part on the angular velocity error, wherein a plant matrix of the angular velocity controller is dense such that each component of the plant matrix is non-zero, and a closed-loop transfer function matrix of the angular velocity controller comprises non-zero value diagonal components and zero value off-diagonal components, and
computing a control surface command for an allocator based at least in part on the moment command.

10. The control system of claim 9, wherein a damping ratio and a natural frequency for each rotational axis of a plurality of rotational axes are prescribed for the angular velocity controller.

11. The control system of claim 9, wherein the angular velocity error comprises a plurality of velocity error components about a plurality of rotational axes.

12. The control system of claim 11, wherein the moment command comprises a plurality of moment command components, each of the plurality of moment command components corresponding to a respective moment about each rotational axis of the plurality of rotational axes for a respective one of the plurality of velocity error components.

13. The control system of claim 9, wherein the control surface command corresponds to adjustments for one or more control effectors of the oblique flying wing aircraft.

14. The control system of claim 13, wherein computing the control surface command with the allocator comprises computing an arrangement for control effectors of the oblique flying wing aircraft for the moment command.

15. The control system of claim 9, wherein the instructions further comprise applying an exponential decay to a time step integrator of the angular velocity controller.

16. The control system of claim 9, wherein the instructions further comprise implanting anti-windup by adjusting components of an identity matrix from one to zero.

17. A robust control method for decoupled stabilization of an asymmetric aircraft, comprising:

computing an angular velocity error between a reference angular velocity and an actual angular velocity;

computing a moment command with an angular velocity controller based at least in part on the angular velocity error, wherein the angular velocity controller decouples two or more of a yaw rate axis, a pitch rate axis, and a roll rate axis of the asymmetric aircraft for the moment command; and adjusting one or more control effectors of the asymmetric aircraft based at least in part on the moment command such that a yaw rate adjustment command only adjusts yaw of the asymmetric aircraft, a pitch rate adjustment command only adjusts pitch of the asymmetric aircraft, and a roll rate adjustment command only adjusts roll of the asymmetric aircraft.

18. The control method of claim 17, wherein the angular velocity controller comprises a function $$G_c(s) = \begin{bmatrix} -IA\vec{\omega}_n^2 & I^T\vec{\omega}_n^2 \end{bmatrix} \begin{bmatrix} s\mathbb{1}_{6\times6} - \begin{bmatrix} \mathbb{0}_{3\times3} & \mathbb{1}_{3\times3} \\ \mathbb{0}_{3\times3} & -2\zeta\vec{\omega}_n \end{bmatrix} \end{bmatrix}^{-1} \begin{bmatrix} \mathbb{0}_{3\times3} \\ \mathbb{1}_{3\times3} \end{bmatrix}$$

wherein

I is a moment of inertia matrix,

A is a state matrix defined as $$A = I^{-1}\frac{\partial M}{\partial \omega},$$

$$\frac{\partial M}{\partial \omega}$$

is a Jacobian of a moment with respect to angular velocity for a plurality of rotational axes of the oblique flying wing aircraft, $\vec{\xi}$ is a prescribed damping ratio, and $\vec{\omega}_n$ is a prescribed natural frequency.

19. The control method of claim 18, further comprising implanting anti-windup by adjusting components of the $\mathbb{1}_{3\times3}$ in the $$\begin{bmatrix} s\mathbb{1}_{6\times6} - \begin{bmatrix} \mathbb{0}_{3\times3} & \mathbb{1}_{3\times3} \\ \mathbb{0}_{3\times3} & -2\zeta\vec{\omega}_n \end{bmatrix} \end{bmatrix}^{-1}$$

portion of the function from one to zero.

\* \* \* \* \*